Patented Aug. 31, 1948

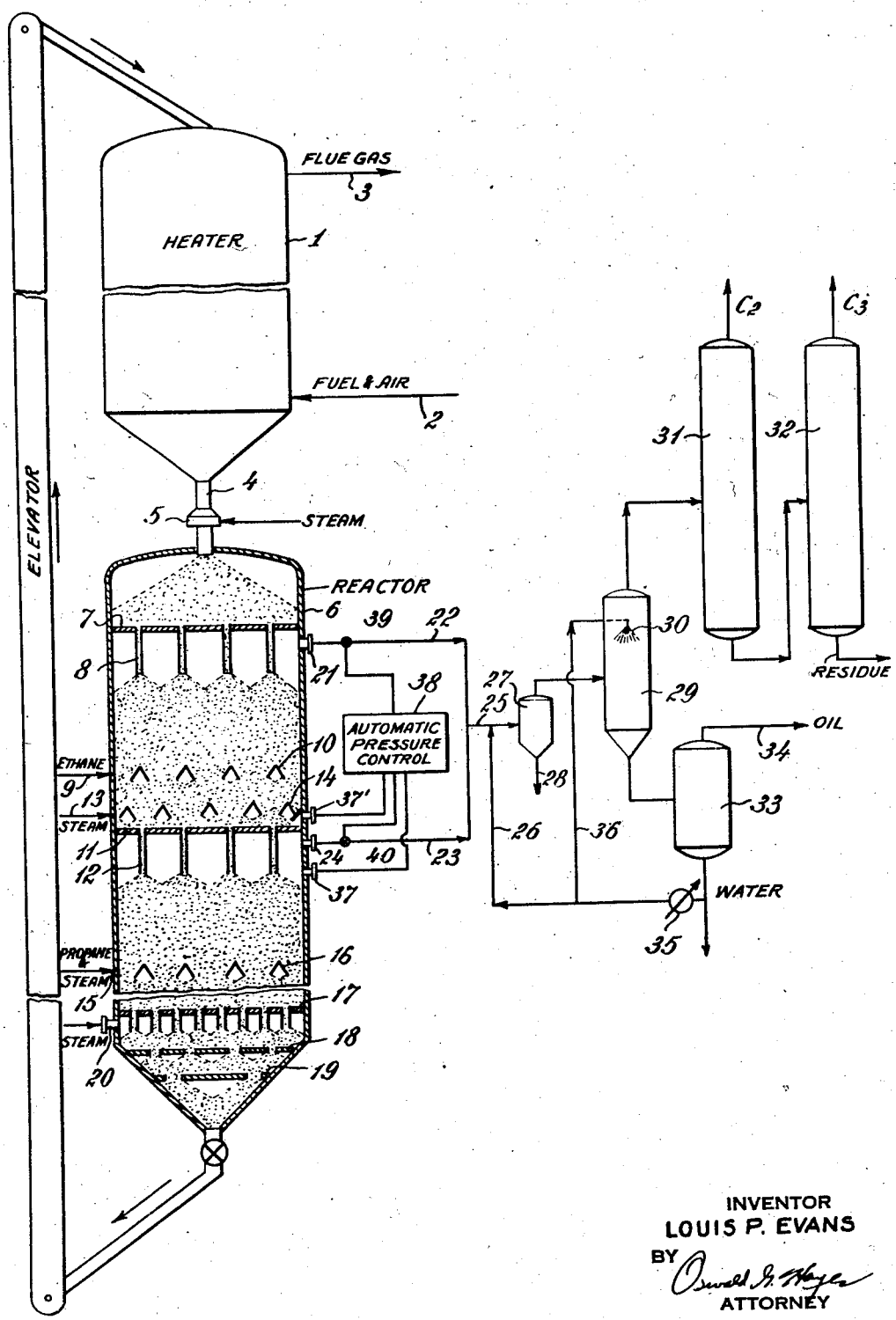

2,448,257

UNITED STATES PATENT OFFICE 2,448,257

PROCESS FOR CONVERTING HYDROCARBON GASES

Louis P. Evans, Woodbury, N. J., assignor to Socony-Vacuum Oil Company, Incorporated, a corporation of New York Application July 16, 1946, Serial No. 683,831

1 Claim. (Cl. 260—683)

This invention relates to process and apparatus for cracking hydrocarbons by contact with a highly heated granular solid heat transfer agent. More particularly, the invention is concerned with contacting a hot granular heating agent with two successive types of charge hydrocarbons of decreasing refractory nature and controlling the contacting process.

Hydrocarbons may be readily converted to high yields of gaseous olefins by reaction at elevated temperatures on the order of 1500° F. and above for very short reaction periods. Crude peroleum and gas oils are readily converted at 1500 to 1600° F. using reaction times on the order of 0.2 second. The more refractory hydrocarbons such as propane and ethane require higher temperatures running up to 1800 to 2000° F. for satisfactory yields. The process is advantageously conducted by passing a granular solid heat transfer agent in a cyclic manner through a heater and thence through a reaction contactor wherein the hydrocarbons are passed through a substantially compact moving bed of highly heated granular solid. In conducting the process for conversion of the more refractory hydrocarbons, the problem of recycling to the heater may present very important practical difficulties since existing elevators will not operate satisfactorily in conveying solids at temperatures of the order of 1500° F. The granular solid discharged from contact with ethane does therefore require chilling as by spraying water or steam thereon to bring it down to satisfactory elevated temperatures.

According to the present invention, a hot granular solid is used for cracking successively less refractory hydrocarbon charge materials to thus bring its temperature down to tolerable levels. The invention is particularly concerned with means for controlling the several reaction zones to maintain the system in suitable balance. According to the invention, the pressures existing on either side of a line of demarkation between two reaction zones are used to control operation of the process and thus maintain substantially no pressure drop across the line of demarkation between the two zones.

According to a preferred embodiment of the invention, this is accomplished by automatic control of the back pressure on discharge ports from the adjacent zones as shown in the annexed drawing which represents diagrammatically, a system for the cracking of hydrocarbons to produce ethylene and the like.

A granular solid heat transfer material such as fused alumina pellets of about 0.3 inch in diameter is heated in a heater 1 by combustion of fuel and air supplied through line 2, the flue gases being withdrawn by 3 and conveyed to a suitable stack or economizer. The granular solid at a temperature of about 1800 to 2000° F. is transferred downwardly through a feed leg 4 having a steam sealing chamber 5 to a reactor 6. A plate 7 in the top of reactor 6 provides a bulk supply hopper in the top of the reactor from which the hot solid passes downwardly by feed pipes 8 to provide a compact moving bed in a reaction zone. Ethane is introduced at 9 to be distributed across the bed by inverted angles 10 from which it passes upwardly through the hot solid countercurrent to movement of the bed to be rapidly heated to the temperature of the granular solid.

A second plate 11 separates the ethane reaction zone from a propane reaction zone to which the solids are transferred through feed pipes 12. The feed pipes 12 provide a transfer zone of restricted cross section having considerable resistance to gaseous flow and thus forming a boundary between the two zones. The zones may be further isolated by steam introduced at 13 and distributed across the bottom of ethane reaction zone by inverted angles 14. The amount of steam introduced at this point may be controlled to give a desired mixture of ethane and steam in the ethane reaction zone since the conversion to olefins appears to proceed better in the presence of steam. Advantageously, steam may be introduced in amounts on the order of 10 to 50% by weight based on the hydrocarbon reactant. The solid is transferred between the zones at a temperature of about 1600 to 1800° F. and a mixture of propane and steam is introduced to the propane reaction zone by line 15 and distributed across the bed by inverted angles 16. If additional cooling of the granular solid is desired at this point, the charge may be liquid propane and water to further cool by vaporizing the charge. Additional zones of the same type may be provided below the propane reaction zone for cracking of crude petroleum or gas oil at temperatures on the order of 1500 to 1600° F. The granular solid is withdrawn uniformly from the bottom of the reactor 6 by means of flow control plates 17, 18 and 19 and is then returned to the top of heater 1 for recycling in the system. Preferably, the solid is purged with steam before discharge as by admitting steam at port 20 between the flow control plates 17 and 18. If additional cooling is found desirable, water may be introduced at this point.

The reaction products from the two, or more, reaction zones are combined as shown. The ethane reaction products are withdrawn at port 21 and passed by line 22 to a junction with transfer line 23 connected to the port 24 of the propane reaction zone. These two streams are combined in pipe 25 and quenched by water admitted through pipe 26 and the vaporous mixture is conducted to a tar separator 27 from which heavy material is withdrawn for discard at 28. The vapor from separator 27 is passed to a spray condenser 29 having a water spray 30 wherein the vapors are cooled to about 100° F. and transferred to the fractionating system indicated by fractionators 31 and 32. The $C_2$ fraction from fractionator 31 is conveyed to a suitable gas plant for recovery of ethylene while the $C_3$ fraction is advantageously returned to the propane reaction zone. The liquid separated in spray condenser 29 is transferred to a settler 33 wherein it stratifies to provide an oil layer withdrawn at 34 and a water layer which is cooled in heat exchanger 35 and recycled, at least in part, to quench line 36 and spray condenser 29.

Returning to the reactor 6, pressure responsive elements 37' and 37 are provided to indicate the pressures existing on either side of the plate 11. These pressure responsive elements are connected to an automatic pressure control 38 which actuates valves 39 and 40 in the discharge lines 22 and 23 respectively. Thus, if the pressure is lower in the ethane reaction zone than in the propane reaction zone, the valves are actuated to impose a greater back pressure on the ethane zone or a lesser back pressure on the propane zone and thus return the system to balance.

I claim:

The process which comprises passing a hot granular solid downwardly in series through an upper reaction zone and a lower reaction zone, transferring said solid downwardly from said upper zone to said lower zone through a transfer zone of restricted cross-section, passing ethane in direct contact with said solid in said upper zone, passing propane in direct contact with said solid at a lower temperature in said lower zone, maintaining the pressures in said upper and lower zones adjacent said transfer zone substantially equal, combining the effluent stream from said upper and lower zones, separating a $C_3$ cut from the combined streams and recycling said cut to said lower zone.

LOUIS P. EVANS.

REFERENCES CITED

The following references are of record in the file of this patent:

UNITED STATES PATENTS

| Number | Name | Date |
|---|---|---|
| 2,327,175 | Conn | Aug. 17, 1943 |
| 2,372,018 | Ruthruff | Mar. 20, 1945 |
| 2,418,673 | Sinclair et al. | Apr. 8, 1947 |
| 2,418,679 | Utterback | Apr. 8, 1947 |